(12) United States Patent
Albizuri Landa

(10) Patent No.: US 8,196,897 B2
(45) Date of Patent: Jun. 12, 2012

(54) DEVICE FOR DISTRIBUTING GAS TO A COOKING APPLIANCE

(75) Inventor: Iñigo Albizuri Landa, Múxika (ES)

(73) Assignee: Coprecitec, S.L., Aretxabaleta (Gipuzkoa) (ES)

( * ) Notice: Subject to any disclaimer, the term of this patent is extended or adjusted under 35 U.S.C. 154(b) by 676 days.

(21) Appl. No.: 12/367,373

(22) Filed: Feb. 6, 2009

(65) Prior Publication Data
US 2009/0140193 A1    Jun. 4, 2009

Related U.S. Application Data

(63) Continuation of application No. PCT/ES2007/070121, filed on Jun. 19, 2007.

(30) Foreign Application Priority Data

Aug. 7, 2006    (ES) .............................. 200601861 U

(51) Int. Cl.
    *F16K 5/10*    (2006.01)
(52) U.S. Cl. ........................... 251/209; 251/310; 126/52
(58) Field of Classification Search ................. 251/310, 251/312, 208, 209, 96, 205, 309; 126/52, 126/39 N; 137/625.32, 601.16, 625.47, 625.46
    See application file for complete search history.

(56) References Cited

U.S. PATENT DOCUMENTS

| | | | | |
|---|---|---|---|---|
| 2,723,102 A | * | 11/1955 | Mueller | 251/96 |
| 2,902,253 A | * | 9/1959 | Page | 251/209 |
| 2,951,501 A | * | 9/1960 | Thylefors | 137/501 |
| 3,001,547 A | * | 9/1961 | Brumbaugh | 137/614.17 |
| 3,173,448 A | * | 3/1965 | Jones | 137/614.19 |
| 4,947,891 A | * | 8/1990 | Genbauffe | 137/599.17 |
| 5,009,393 A | * | 4/1991 | Massey | 251/207 |
| 5,551,467 A | * | 9/1996 | Booth et al. | 137/1 |
| 6,520,481 B2 | * | 2/2003 | Harneit | 251/207 |
| 6,808,162 B2 | * | 10/2004 | Tranovich et al. | 251/209 |
| 6,845,966 B1 | * | 1/2005 | Albizuri | 251/207 |

(Continued)

FOREIGN PATENT DOCUMENTS

ES        181114 Y       2/1974

(Continued)

OTHER PUBLICATIONS

International Search Report for International Application No. PCT/ES2007/070121 dated Oct. 15, 2007.

*Primary Examiner* — John Fristoe, Jr.
*Assistant Examiner* — Andrew J Rost
(74) *Attorney, Agent, or Firm* — Tim L. Kitchen; Peter B. Scull; Hamilton, DeSanctis & Cha, LLP

(57) ABSTRACT

A gas tap for controlling the flow of a gas to a cooking appliance. In one embodiment, the gas tap includes a body and a rotatable regulation member positioned within the valve body, the valve body having a stationary groove for the inlet of gas from an exterior wall surface to an interior wall surface of the body, the regulation member having a passage opening for the inlet of gas from an exterior surface to an interior cavity of the regulation member, the passage opening moving with an angular rotation of the regulation member. The groove and passage opening are shaped, dimensioned and positioned relative to one another such that the regulation of an intermediate gas flow Qgra (a flow between Qmax and Qmin) is proportional to the angular displacement of the rotatable regulation member.

20 Claims, 3 Drawing Sheets

U.S. PATENT DOCUMENTS

| | | | |
|---|---|---|---|
| 6,880,571 B2 * | 4/2005 | Lin | 137/599.17 |
| 2002/0033464 A1 | 3/2002 | Harneit | |

FOREIGN PATENT DOCUMENTS

| ES | 272670 Y | 12/1983 |
| ES | 1059642 U | 5/2005 |
| FR | 2171695 A5 | 9/1973 |
| GB | 831809 A | 3/1960 |
| GB | 914107 A | 12/1962 |
| GB | 1261141 A | 1/1972 |
| JP | 8110039 A | 4/1996 |
| WO | WO9721960 A1 | 6/1997 |

* cited by examiner

US 8,196,897 B2

DEVICE FOR DISTRIBUTING GAS TO A COOKING APPLIANCE

CROSS-REFERENCE TO RELATED APPLICATIONS

This application claims priority to PCT/ES2007/070121 filed Jun. 19, 2007, which claims priority to Spanish Patent Application No. U200601861, filed Aug. 7, 2006.

TECHNICAL FIELD

The present invention relates to a device for distributing a gas flow to a domestic cooking appliance, which may include a number of rotary taps integrated into the distribution pipe, for regulating the individual gas flow supplied to an outlet conduit of said tap.

BACKGROUND

There are known gas fuel distributors for a cooking appliance of the type mentioned above, such as that disclosed in WO 97/21960, which comprises various taps integrated in a distribution pipe, distanced from each other, and assembled with means for the airtight closure of the insertion holes on the tap body in the pipe.

Each of the gas taps disclosed therein includes a body portion comprising a fixed generally hollow frusto-conical casing positioned within the distribution pipe that has an inlet orifice for the inlet of gas from the distribution pipe. The gas tap also include a frusto-conical rotary plug member located within the casing having both a major orifice and a minor orifice. The plug member is rotatable by means of a control key such that the major and minor orifices of the plug member can be moved into and/or out of varying degrees of alignment with the inlet orifice of the casing to regulate or control the volume of gas flow through an outlet port of the tap. The major orifice is for variation of the gas flow from low to high flame in an associated burner and the minor orifice is for achieving a very low 'simmer' flame level. This device for gas distribution presents a problem in that the casing and the rotary plug member have substantially circular passage openings that cannot regulate an intermediate flow "Qgra" proportional to the angular path of the conical member. In addition, the distribution pipe of this known device for gas distribution has two flat opposing walls for the insertion and exit of the tap body, as a result of which the airtight closure of the coupling with the flat walls of the pipe is simple.

SUMMARY OF THE DISCLOSURE

It is an object of present invention to provide a device for distributing a gas flow to a domestic cooking appliance, preferably with a number of regulation taps inserted between the walls of a common distribution pipe, wherein both the surface of the tap body and a rotary regulation member have passage openings that overlap each other for the regulation of an intermediate flow "Qgra" proportional to the angular displacement of the conical member, between two constant flows, the maximum "Qmax" and the minimum "Qmin".

The passage opening in the tap body and in the rotary regulation member possess contours of a specific shape, such as the ones described in detail in the following section, both passage openings being formed by portions of a surface area adjacent to each other in succession, which cooperate by means of their overlapping in the direction of rotation to create said three flows, the intermediate flow "Qgra" also being variable in a linear manner.

In addition, for the purposes of using a cylindrical pipe for the assembly of the distributing device, the invention resolves the problem of the coupling between the tap body and the cylindrical pipe, by means of an airtight closure of both insertion holes on the tap body, which are not flat but which have the geometrical profile of the orthogonal intersection of two cylinders.

DETAILED DESCRIPTION

Figure 1:
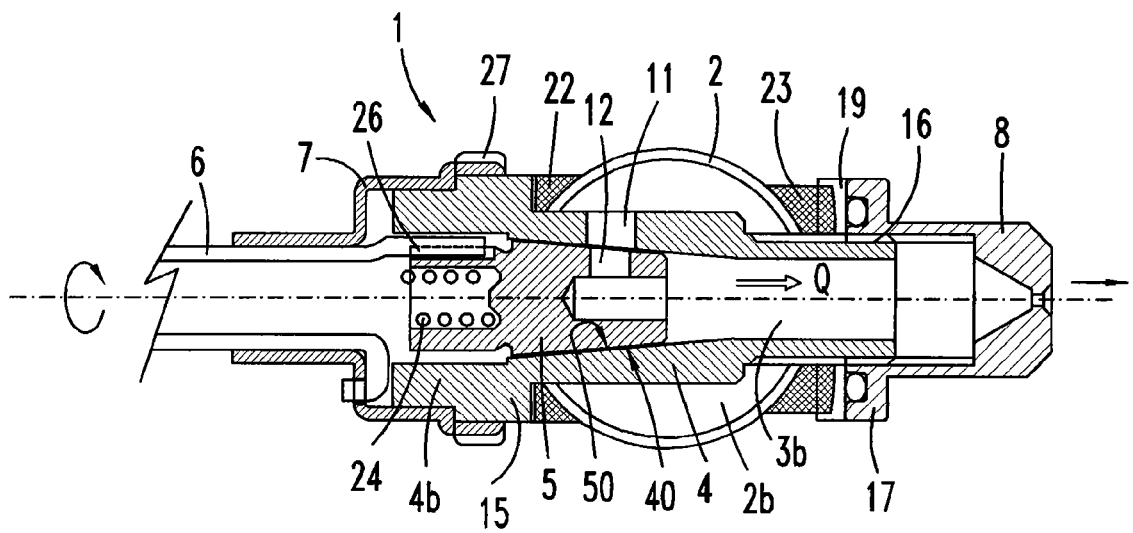
FIG. 1 is a cross-sectional view of a device of one embodiment for distributing gas for cooking with the taps integrated in the distribution pipe.

With reference to FIGS. 1 to 5, a device for distributing gas 1 in accordance with one embodiment is illustrated. As shown, the device comprises an elongated gas distribution pipe 2, preferably cylindrical, of the type that is connected at one end to a gas source of a domestic cooking appliance, and a number of rotary taps 3 integrated into the distribution pipe 2 that are distanced from each other for the individual supplying of a gas flow "Q" to a corresponding burner.

Each of taps 3 comprise a tap body 4 and a internal regulation member 5 that may be conical, the part of the body 4a that cooperates with the regulation of the gas flow "Q" being housed inside the pipe 2. The gas supplied by the source circulates through the inlet hole 2b of the pipe 2, and reaches the tap 3 first of all through a regulation groove 11 on the surface of the body 4a, and then through a rotary passage opening 12 towards the interior of the conical member 5, from where the gas is led to an outlet conduit 3b in the tap body. Outside the distribution pipe 2, a nozzle 8 is threaded to the outlet end 4c of the tap for injecting the regulated flow "Q" to the intake of the mixture of the corresponding burner.

The gas flow "Q" circulating through the pipe 2 is distributed between the various integrated taps 3, each of them being capable of supplying, in this order, a maximum flow Qmax, an intermediate flow Qgra, and a minimum flow Qmin, by rotating the shaft 6 of the tap.

Figure 5:
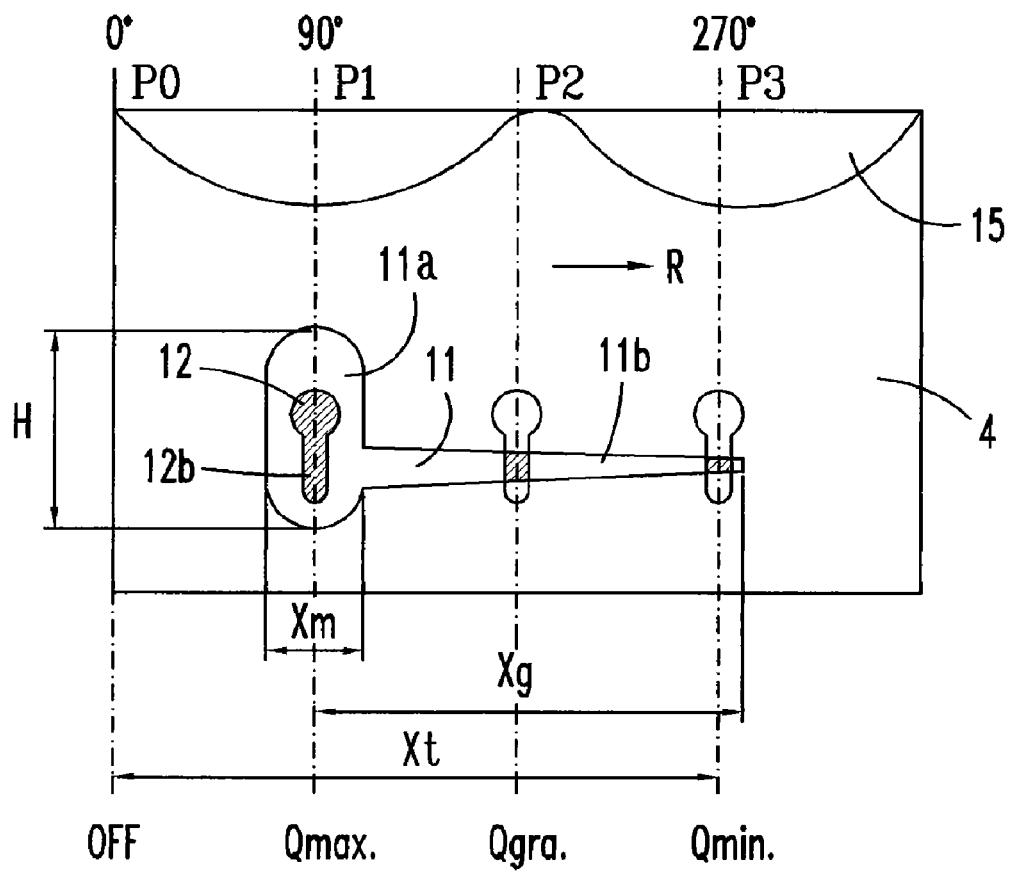
FIG. 5 is a flat view of the tap body of FIG. 4, showing its surface developed with a regulation groove.

The conical member 5 is coupled to the drive shaft 6, the coupling of both to the tap body 4 being covered by a cap 7 which guides the rotation of the shaft 6 between two stops of an angular path of preferably 270° (FIG. 5). The conical member 5 is disposed inside the body 4. In one embodiment a spring 24 is provided as a biasing force that continually urges the conical member 5 into the interior of the valve body 4 as shown in FIG. 1. A flap 26 in the shaft 6 which is configured to engage with a recess 25 in the regulation member 5 enables a rotation of the shaft 6 to induce a rotation of the regulation member 5. A passage opening 12 is provided within the rotatable regulation member 5 and moved with it, whereas a stationary elongated groove 11 is provided in the wall 4a of the tap body 4. The passage opening 12 is moveable between two angular positions P0-P3 relative to the body 4 in order to supply said flows Qmax, Qgra and Qmin.

In one embodiment, the body 4 of the tap 3 comprises three substantially cylindrical body parts 4a, 4b and 4c of different diameters forming sections 9 and 10 in the axial direction towards the pipe 2, the intermediate part 4a forming a cylindrical wall that contains the stationary regulation groove 11 and which is inserted into the pipe intake hole 2b through a hole 13 in the cylindrical wall of the pipe 2a. This intermediate part of the body 4a has a machined internal hollow space with a conical surface 40, inside which the conical member 5 is fitted, pushed by the spring 24.

The first part 4b of greater diameter is outside the pipe 2, and forms a cross-section 9 as an insertion limit in the pipe 2, out of which axially project two arched lobes 15 with a transverse edge surrounding the hole 13 in the cylindrical wall of the pipe 2a, the shape of which follows the geometric line of intersection with a cylinder, thereby enabling its orthogonal coupling to the cylindrical wall of the pipe 2a. An airtight seal 22 of a specific shape is interposed with the cylindrical wall of the pipe 2, upon said transverse edge of these lobes 15, thereby surrounding the hole 13 in the pipe, through which the body 4 passes to ensure its airtight closure. The airtight seal 22 has a recess, on one of its faces, configured with a geometric surface equivalent to the intersection of two cylinders of different diameter, that of the intermediate part 4a of the inserted body, and that of the pipe 2, and it has a flat surface, on the other face, for its tightening against said cross-section 9, which is also flat. The external part of the body 4b has two pairs of peripheral ribs 27 that face each other, in which is connected a respective flap of the cover 7 to ensure the positioning and guidance of the cover 7 with the tap.

Part 4c of the body is a body end 16 with an external thread for fixing said injector nozzle 8 from the outside of the pipe 2. The body end 16 forms a second cross-section 10 in the body, being disposed inside the gas intake hole 2b, from which is created an outlet pipe 3b of the tap of flow "Q" which projects out of the pipe 2 for fixing the nozzle 8. The latter has a nut 17 for its coupling to the cylindrical wall of the pipe 2, and an injector hole 18 on the free end to supply the mixture fuel intake to the corresponding burner. An adaptor casing 19 and an airtight seal 23 (FIG. 2) are assembled between the pipe 2 and the nut 17 of the nozzle, the shapes of which are designed for the closure against the cylindrical wall of the pipe 2. The adaptor casing 19 has a cylindrical surface 20, preferably concave, on the side of the coupling to the pipe 2, inside of which the airtight seal 23 is fitted, and on the opposite side, the surface 21 of the adaptor casing 19 is flat, in order to make an uniform tightening contact against the flat surface 17 on the nozzle. The airtight seal 23 has a curved concave surface geometrically adapted to the intersection of the cylindrical body 4 with the hole 14 of the pipe 2, which is also cylindrical. The adaptor casing 19 may also have a different shape to the one described, for example with the curved face 20 in the shape of a semi-spherical lobe, which enters the central hole of the airtight seal 23, tightening it uniformly against the hole 14 in the pipe 2.

Figure 4:
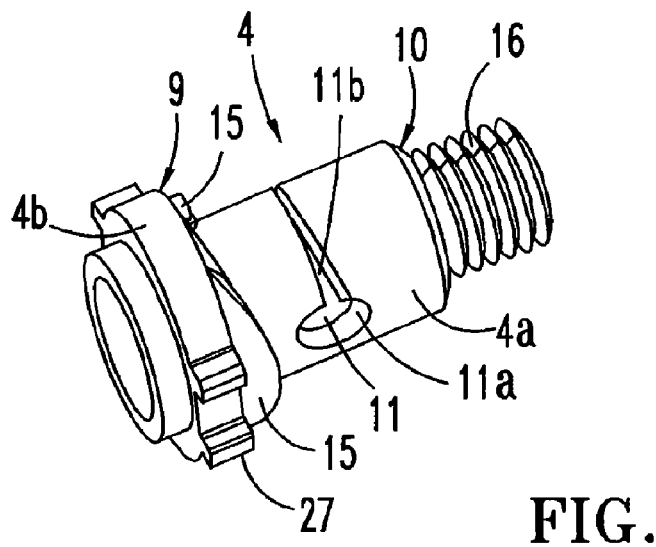
FIG. 4 is a perspective view of a tap body of the device for distributing gas of FIGS. 1 and 2.

With reference to FIGS. 4 and 5, the regulating groove 11 located within the wall 4a of the body 4 is stationary, and has a contour formed by two passage areas 11a and 11b that are different to each other. One passage area 11a of a considerable size regulates the flow "Qmax" and preferably has an approximately rectangular shape with two opposite rounded sides to enable its machining, for example of a length "Xm" of around 3 mm and a height "H" of around 6 mm, and also enabling the adjustment of the relative position between conical surfaces 40 and 50. Next to the passage area 11a of considerable size for the Qmax, a convergent groove 11b is adjacently formed, the passage area 11b of which is narrow and long and extends in the direction of rotation "R" of the conical member 5, as a result of which it regulates linearly the intermediate flow Qgra. In one embodiment, the widest end of the convergent groove 11b is around 1.1 mm and the length "Xg" of the convergent groove 11b is around 15 mm which is equivalent to an angular path of approximately 180°. The end of the convergent groove 11b provides the minimal flow Qmin.

Figure 3:
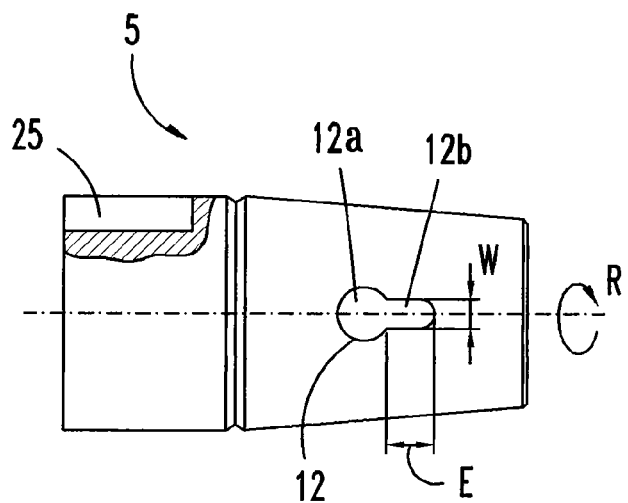
FIG. 3 is a profile view of a conical regulation member of the tap of the device for distributing gas of FIGS. 1 and 2.
Figure 2:
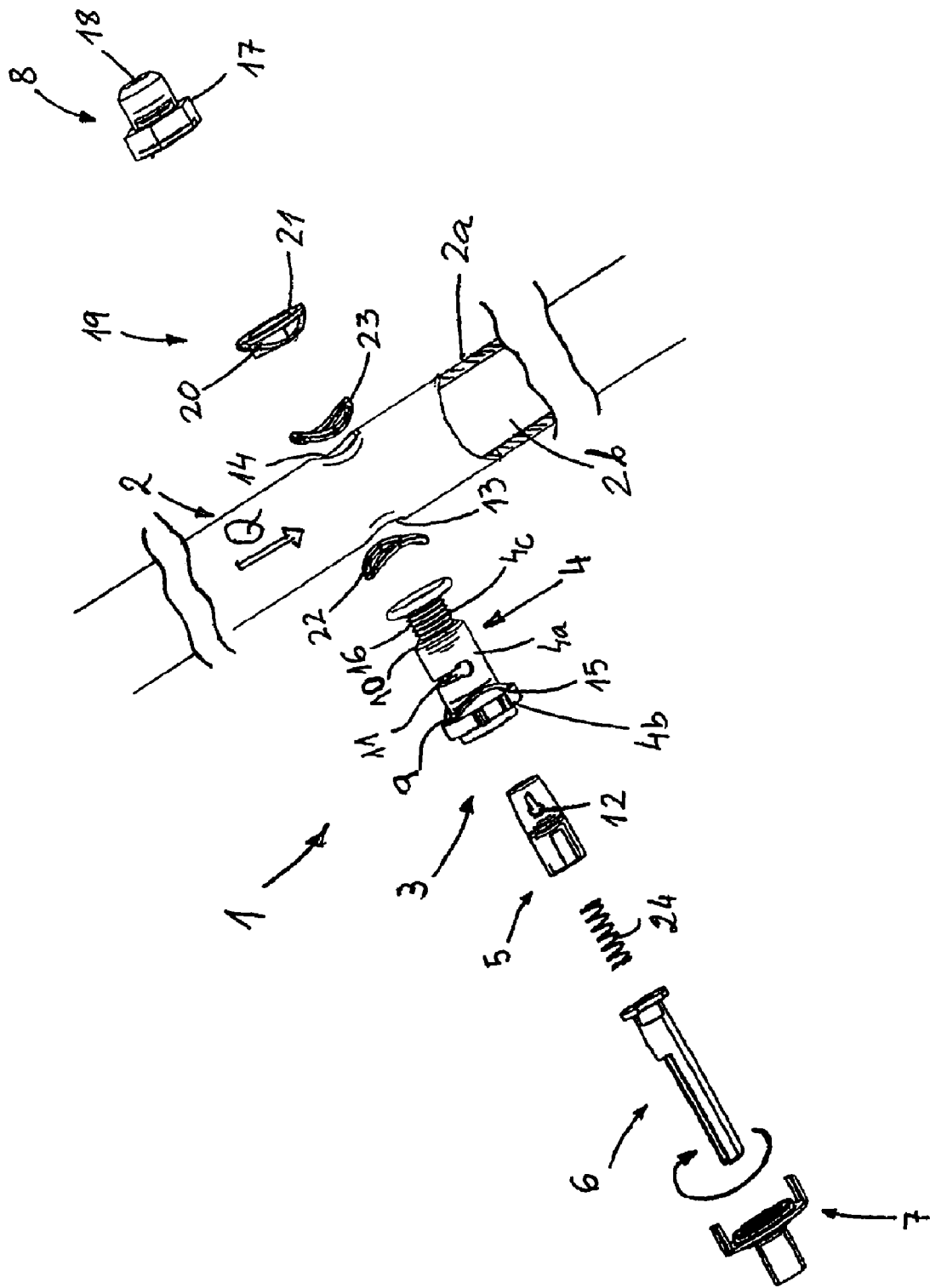
FIG. 2 is a fragmentary view in perspective of the device for distributing gas of FIG. 1, showing each part in its relative assembly position.

With reference to FIG. 3, the conical regulation member 5 comprises said passage opening 12 that overlaps in its rotation over the regulating groove 11 located within the wall 4a of the body 4. This passage opening 12 has a contour that cooperates in the regulation of the various flows "Q" supplied by the tap 3. The passage opening 12 comprises two portions of different size 12a and 12b that are located adjacent to each other and configured to overlap with the passage groove 11 within the wall 4a of the body 4. Portion 12a having a larger cross-sectional area than portion 12b. Portion 12a of passage 12 is preferably circular in shape and has a diameter of, for example, 1.8 mm for passing the Qmax. Portion 12a is situated in such a way that it can overlap only with said broad passage opening 11a of the groove 11 in the wall of the body 4. Next, the smaller area of passage 12b is preferably substantially rectangular and has a width "W" with a dimension less than portion 12a. In one embodiment, portion 12b has a length "E" of around 2 mm and a width "W" of around 1 mm. As shown in FIG. 5, only portion 12b is interposed with the convergent groove portion 11b in the wall 4a of the body 4, causing during its rotation an intermediate flow Qgra that gradually decreases, in accordance with the angle rotated, to a relative final position P3, in which it supplies the Qmin. The length "E" of the passage area 12b of the conical member 5 is preferably sufficiently long for it to cover the maximum width of, for example, 1.1 mm of the stationary convergent groove 11b in the body 4.

With reference to FIGS. 4 and 5, the passage opening 12 of the conical member 5 occupies a number of defined positions P0-P3 in relation to the stationary regulating groove 11 of the wall 4a of the body 4. In an initial position P0, the opening 12 is separated from the regulating groove 11 and corresponds with the "OFF" closure of the tap. In one embodiment, following the direction of rotation "R" of the conical member, and after 90° rotation corresponding to the position P1, both passage areas of portions 12a and 12b of the opening 12 overlap completely with the area 11a of considerable size opening 11a of groove 11 located within the wall 4a of the body, the maximum flow Qmax quickly being established in the outlet conduit 3b. Continuing the rotation "R", only the portion 12b of passage opening 12 overlaps with the convergent groove portion 11b as it successively crosses intermediate gas flow positions P2. Portion 12b of opening 12 and the convergent groove portion 11b are preferably shaped and dimensioned to provide an intermediate flow Qgra which is linearly regulated over the length of the gradually decreasing groove portion 11b, and in accordance with the angular rotation of shaft 6. In a final position P3 of the passage opening 12, the conical member 5 comes up against a limit that prevents its subsequent rotation in the direction "R", and here in the final limit position P3, with the conical member 5 having completed a total angular path "St" equivalent to, for example, 270° from the "OFF" closure position P0, a constant minimum flow Qmin is provided to the outlet conduit 3b. In the successive intermediate positions P2 of linear regulating of the Qgra, and in the final position P3, only the narrow area 12b of the passage opening 12 of the conical member is interposed with the stationary convergent groove 11b.

What is claimed is:

1. A gas tap comprising:
    a body containing a stationary groove for the inlet of gas from an exterior surface to an interior cavity of the body, the groove having a first portion with a first cross-sectional area and a second convergent portion having a length and at a first end adjacent to the first portion a maximum width dimension and at a second end a minimum width dimension, the body further having an outlet opening for the passage of gas out of the body, and
    a rotatable regulation member positioned within the interior cavity of the body having a passage opening for the inlet of gas from an exterior surface of the regulation member to an interior cavity of the regulation member, the passage opening including a first portion having a first cross-sectional area and a second portion having a second cross-sectional area smaller than the first cross-sectional area, the regulation member having an outlet opening in fluid communication with the outlet opening of the body, the regulation member rotatable between a first angular position corresponding to a closed position of the gas tap, a second angular position corresponding to a maximum permissible gas flow through the gas tap, a fourth angular position corresponding to a minimum permissible gas flow through the gas tap, and a variable third angular position between the second and fourth angular positions that corresponds to a variable intermediate gas flow through the gas tap, in the first angular position neither the first or second portions of the passage opening overlap with any portion of the groove, in the second angular position both the first and second portions of the passage opening entirely overlap with the first portion of the groove, in the third and fourth angular positions only the second portion of the passage opening overlaps with the groove and only with the convergent portion of the groove.

2. A gas tap according to claim 1 wherein the second portion of the passage opening and the second convergent portion of the groove are shaped, dimensioned and disposed relative to another such that the regulation of the intermediate gas flow is proportional to the angular displacement of the rotatable regulation member.

3. A gas tap according to claim 2 wherein the first and second portions of the passage opening of the rotatable regulation member are contiguous with one another and, other than the outlet opening, form the only passage between the exterior surface and the interior cavity of the regulation member, and wherein the first portion and the second convergent portion of the groove in the body are contiguous with one another and form the only passage between the exterior surface and the interior cavity of the body.

4. A gas tap according to claim 1 wherein the second portion of the passage opening and the second convergent portion of the groove are shaped, dimensioned and disposed relative to one another such that the intermediate gas flow changes linearly as the regulation member rotates between the second and fourth angular positions.

5. A gas tap according to claim 4 wherein the interior cavity of the body and the exterior surface of the rotatable regulation member are conical.

6. A gas tap according to claim 4 wherein the first and second portions of the passage opening of the rotatable regulation member are contiguous with one another and wherein the first portion of the groove and the second convergent portion of the groove are contiguous with one another.

7. A gas tap according to claim 4 wherein the stationary groove and the gas outlet opening are the only passages between the exterior of the body and the interior cavity of the body.

8. A gas tap according to claim 7 wherein the first and second portions of the passage opening of the rotatable regulation member are contiguous with one another and wherein the first portion of the groove and the second convergent portion of the groove are contiguous with one another.

9. A gas tap according to claim 7 wherein the second portion of the passage opening is sufficiently long to extend across the maximum width dimension of the first portion of the convergent portion of the groove.

10. A gas tap according to claim 7 wherein the interior cavity of the body and the exterior surface of the rotatable regulation member are conical.

11. A gas tap according to claim 4 wherein the first and second portions of the passage opening of the rotatable regulation member are contiguous with one another and, other than the outlet opening, form the only passage between the exterior surface and the interior cavity of the regulation member, and wherein the first portion and the second convergent portion of the groove in the body are contiguous with one another and form the only passage between the exterior surface and the interior cavity of the body.

12. A gas tap according to claim 1 wherein the first and second portions of the passage opening of the rotatable regulation member are contiguous with one another.

13. A gas tap according to claim 12 wherein the second portion of the passage opening is sufficiently long to extend across the maximum width dimension of the first portion of the convergent portion of the groove.

14. A gas tap according to claim 1 wherein the first portion and the second convergent portion of the groove are contiguous with one another.

15. A gas tap according to claim 1 wherein the first and second portions of the passage opening of the rotatable regulation member are contiguous with one another and wherein the first portion and the second convergent portion of the groove in the body are contiguous with one another.

16. A gas tap according to claim 1 wherein the stationary groove and the gas outlet opening are the only passages between the exterior of the body and the interior cavity of the body.

17. A gas tap according to claim 1 wherein the first and second portions of the passage opening of the rotatable regulation member are contiguous with one another and, other than the outlet opening, form the only passage between the exterior surface and the interior cavity of the rotatable regulation member.

18. A gas tap according to claim 1 wherein the first and second portions of the passage opening of the rotatable regulation member are contiguous with one another and, other than the outlet opening, form the only passage between the exterior surface and the interior cavity of the regulation member and wherein the first portion and the second convergent portion of the groove in the body are contiguous with one another and form the only passage between the exterior surface and the interior cavity of the body.

19. A gas tap comprising:
    a body containing a stationary groove for the inlet of gas from an exterior surface of the body to an interior cavity of the body, the groove having a first portion with a first cross-sectional area and a second convergent portion having a length and at a first end adjacent to the first portion a maximum width dimension and at a second end a minimum width dimension, the body further having an outlet opening for the passage of gas out of the body, and a rotatable regulation member positioned within the interior cavity of the body having a passage opening for the inlet of gas from an exterior surface of the regulation member to an interior cavity of the regulation member, the passage opening including a first portion having a first cross-sectional area and a second portion having a second cross-sectional area smaller than the first cross-sectional area, the regulation member having an outlet opening in fluid communication with the outlet opening of the body, the regulation member rotatable between a first angular position corresponding to a closed position of the gas tap, a second angular position corresponding to a maximum permissible gas flow through the gas tap, a fourth angular position corresponding to a minimum permissible gas flow through the gas tap, and a variable third angular position between the second and fourth angular positions that corresponds to a variable intermediate gas flow through the gas tap, in the first angular position neither the first or second portions of the passage opening overlap with any portion of the groove, in the second angular position both the first and second portions of the passage opening entirely overlap with the first portion of the groove, in the third and fourth angular positions only the second portion of the passage opening overlaps with the groove and only with the convergent portion of the groove, wherein the second portion of the passage opening and the second convergent portion of the groove are shaped, dimensioned and disposed relative to one another such that the intermediate gas flow is proportional to the angular displacement of the rotatable regulation member, and wherein the first and second portions of the passage opening of the rotatable regulation member are contiguous with one another and, other than the outlet opening, form the only passage between the exterior surface and the interior cavity of the regulation member, and wherein the first portion and the second convergent portion of the groove in the body are contiguous with one another and form the only passage between the exterior surface and the interior cavity of the body.

20. A gas tap comprising:

a body containing a stationary groove for the inlet of gas from an exterior surface of the body to an interior cavity of the body, the groove having a first portion with a first cross-sectional area and a second convergent portion having a length and at a first end adjacent to the first portion a maximum width dimension and at a second end a minimum width dimension, the body further having an outlet opening for the passage of gas out of the body, and a rotatable regulation member positioned within the interior cavity of the body having a passage opening for the inlet of gas from an exterior surface of the regulation member to an interior cavity of the regulation member, the passage opening including a first portion having a first cross-sectional area and a second portion having a second cross-sectional area smaller than the first cross-sectional area, the regulation member having an outlet opening in fluid communication with the outlet opening of the body, the regulation member rotatable between a first angular position corresponding to a closed position of the gas tap, a second angular position corresponding to a maximum permissible gas flow through the gas tap, a fourth angular position corresponding to a minimum permissible gas flow through the gas tap, and a variable third angular position between the second and fourth angular positions that corresponds to a variable intermediate gas flow through the gas tap, in the first angular position neither the first or second portions of the passage opening overlap with any portion of the groove, in the second angular position both the first and second portions of the passage opening entirely overlap with the first portion of the groove, in the third and fourth angular positions only the second portion of the passage opening overlaps with the groove and only with the convergent portion of the groove, wherein the second portion of the passage opening and the second convergent portion of the groove are shaped, dimensioned and disposed relative to one another such that the intermediate gas flow changes linearly as the regulation member rotates between the second and fourth angular positions, and wherein the first and second portions of the passage opening of the rotatable regulation member are contiguous with one another and, other than the outlet opening, form the only passage between the exterior surface and the interior cavity of the regulation member, and wherein the first portion and the second convergent portion of the groove in the body are contiguous with one another and form the only passage between the exterior surface and the interior cavity of the body.

* * * * *